US Patent [19]

Rosenkranz et al.

[11] 4,339,566
[45] Jul. 13, 1982

[54] WATER-DISPERSIBLE, RADIATION-CROSSLINKABLE BINDING AGENTS FROM URETHANE ACRYLATES, A PROCESS FOR THEIR PRODUCTION, AND THE USE THEREOF IN AQUEOUS DISPERSIONS IN COLOR PAINTING, COLOR PRINTING, AND TEXTILE APPLICATIONS

[75] Inventors: Hans J. Rosenkranz, Krefeld; Hellmut Striegler, Leverkusen; Otto Bendszus, Krefeld, all of Fed. Rep. of Germany

[73] Assignee: Bayer Aktiengesellschaft, Leverkusen, Fed. Rep. of Germany

[21] Appl. No.: 183,076

[22] Filed: Sep. 2, 1980

[30] Foreign Application Priority Data

Sep. 6, 1979 [DE] Fed. Rep. of Germany ....... 2936039

[51] Int. Cl.$^3$ ............................................. C08G 18/38
[52] U.S. Cl. .................. 528/68; 204/159.14; 204/159.16; 204/159.22; 427/36; 427/41; 427/44; 427/385.5; 428/423.1; 528/71; 528/74; 528/75
[58] Field of Search ...................... 528/68, 71, 74, 75; 204/159.14, 159.16, 159.22; 427/36, 41, 44, 385.5; 428/423.1

[56] References Cited

U.S. PATENT DOCUMENTS

| | | | |
|---|---|---|---|
| 4,012,302 | 3/1977 | Wong et al. | 528/75 |
| 4,057,431 | 11/1977 | Finelli | 430/284 |
| 4,153,778 | 5/1979 | Parks | 528/76 |
| 4,224,418 | 9/1980 | Dieterich et al. | 528/71 |

FOREIGN PATENT DOCUMENTS

| | | |
|---|---|---|
| 1942927 | 3/1971 | Fed. Rep. of Germany . |
| 2035732 | 1/1972 | Fed. Rep. of Germany . |
| 2641189 | 4/1977 | Fed. Rep. of Germany . |
| 1280750 | 7/1972 | United Kingdom . |
| 1336050 | 11/1973 | United Kingdom . |

OTHER PUBLICATIONS

Okayaki et al., Chem. Abstr., vol. 81, 1974; 14197d.

*Primary Examiner*—Maurice J. Welsh
*Attorney, Agent, or Firm*—Connolly and Hutz

[57] ABSTRACT

A water-dispersible urethane acrylate binding agent which comprises a reaction product of: (A) 1 gram equivalent NCO of a di- or tri-isocyanate; (B) from 0 to 0.7 gram equivalent OH of a polyol, free of organically bound sulphur; (C) from 0.1 to 0.7 gram equivalent OH of a hydroxy-($C_2$–$C_6$ alkyl)-acrylate; and (D) from 0.01 to 0.5 gram equivalent NH of an amino sulphonic acid or an alkali metal or an alkaline earth metal salt thereof having from 1 to 4 amino groups per sulphonic acid group; the ratio of NCO group: NCO-reactive groups being from 1:1 to 1:1.2 which are prepared by reacting components (A), (B), (C), and (D) in a ratio of NCO groups:NCO-reactive groups of from 1:1 to 1:1.2 at a temperature of from 20° to 100° C. The water-dispersible urethane acrylates, hardenable by high energy radiation or ultraviolet light, are particularly suitable in the production of coatings, painting and printing colors and as binding agent in an aqueous dispersion for impregnating textiles and strengthening non-woven fabrics.

5 Claims, No Drawings

WATER-DISPERSIBLE, RADIATION-CROSSLINKABLE BINDING AGENTS FROM URETHANE ACRYLATES, A PROCESS FOR THEIR PRODUCTION, AND THE USE THEREOF IN AQUEOUS DISPERSIONS IN COLOR PAINTING, COLOR PRINTING, AND TEXTILE APPLICATIONS

The invention relates to unsaturated, radiation-crosslinkable urethane acrylate binding agents which may be converted into stable, aqueous dispersions and to a process for the preparation thereof. In this form, they are suitable for the production of coatings and covering layers, for strengthening and impregnating textiles or webs or as a binding agent for painting or printing colours. The binding agents may be cross-linked to form solid insoluble products by the action of high-energy radiation.

Numerous binding agents which may be hardened by radiation are known. Unsaturated resins which are capable of a cross-linking vinyl polymerisation are currently used in particular for producing coatings on wood, paper or plastics, generally in combination with low viscosity vinyl monomers as diluent, in order to harden them in the shortest time either using an electron-beam generator or, with simultaneous use of a so-called "photoinitiator", using an ultra-violet source. Typical examples in this category are, e.g. unsaturated polyester resins in a styrene solution which may be mixed with benzoin derivatives as the photoinitiator and may be hardened by ultra-violet light. They are described, for example, in German Offenlegungsschrift No. 1,769,168. More recently, particularly those resins which contain esters of acrylic acid incorporated as unsaturated groups are being used. When mixed with other low viscosity acrylic acid esters which are, however, non-volatile, they produce binding agents for lacquers and printing colours which may be hardened in fractions of a second using suitable radiation sources. In this connection, particularly so-called "epoxy acrylates" have proved themselves as binding agents, (see, for example, German Offenlegungsschrift No. 2,349,979) as have urethane acrylates (see German Offenlegungsschrift No. 2,737,406).

The relatively high viscosity of these condensation products usually requires the use of diluents. As mentioned above, these may be polymerising acrylic acid derivatives, so-called "reactive diluents", such as acrylic or methacrylic acid esters of poly hydric alcohols; butane diol-bis-acrylate, hexane diol-bis-acrylate or trimethylolpropane-tris-acrylate. From the toxicological point of view, however, continued efforts will be made to keep these additions as small as possible since low molecular weight acrylic acid derivatives may give rise to skin irritations and allergic reactions. Therefore, large quantities of inert solvents are frequently added to the radiation-hardenable lacquer formulations comprising the conventional lacquer raw materials, in order to achieve the necessary processing viscosity. Thereby, of course, the substantial advantage of this type of binding agent is again relinquished in order to manage without or with only small quantities of polluting solvents. On the other hand, it was to be feared that, during processing the films obtained from an aqueous dispersion or emulsion would have an insufficient resistance to water as a result of the presence of dispersing or emulsifying agents.

It was therefore, an object of the present invention to develop binding agents, being dispersable in water and cross-linkable by radiation, based on urethane acrylates, which produce stable emulsions or dispersions without the addition of a dispersant or emulsifier and which, after hardening, produce water-proof and solvent-resistant products having good mechanical properties.

This object was achieved in that sulphonic acid groups were also incorporated into the urethane acrylates formed from polyisocyanates, polyols and hydroxyalkyl acrylates.

Accordingly, the present invention relates to water-dispersible, radiation-hardenable urethane acrylate binding agents, consisting of a reaction product of (A) 1 gram equivalent NCO of a polyisocyanate having 2 or 3 isocyanate groups per molecule;

(B) from 0.0 to 0.7 gram equivalent OH of a polyol having at least 2, preferably from 2 to 6, OH-groups per molecule;

(C) from 0.1 to 0.7 gram equivalents OH of a hydroxyalkyl acrylate having from 2 to 6, preferably from 2 to 4, carbon atoms in the alkyl group; characterised in that the reaction product also contains incorporated (D) from 0.01 to 0.5 gram equivalents NH of an amino sulphonic acid or an alkali metal salt or an alkaline earth metal salt thereof having from 1 to 4, preferably 1 or 2, amino groups per sulphonic acid group; the total of the OH- and NH-gram equivalents (B) to (D) is from 1 to 1.2, preferably 1.

The present invention also relates to a process for the preparation of water-dispersable urethane acrylate binding agents from the above components (A) to (D), characterised in that the components are reacted together, preferably at temperatures of from 20° to 100° C. and preferably so that the isocyanate component is initially reacted with the hydroxy components and then with the amino sulphonic acid.

Another object of the present invention is the use of the aqueous urethane acrylate binding agent dispersions to produce coatings and covering layers for impregnating and strengthening textile cloths and webs and also for producing painting and printing colours.

The term "polyisocyanates" is to be understood to mean di- and higher poly-functional cycloaliphatic, aliphatic and aromatic isocyanates, preferably di- and tri-functional, particularly di-functional, isocyanates. The following are named by way of example: toluylene diisocyanates, diphenyl methane diisocyanates, isophorone diisocyanate, xylylene diisocyanate, hexamethylene diisocyanate, 4,4'-diisocyanato-biscyclohexyl methane and its positional isomers, polyisocyanates having a biuret structure according to German Pat. No. 1,101,394, e.g. obtained from hexamethylene diisocyanate and water.

The polyisocyanates may be reacted with di- and higher polyols or with di- and higher poly-amines having at least two primary amino groups to form isocyanate prepolymers, whereby the polyol component may also be a polyether polyol and/or a polyester polyol (see British Pat. No. 743,514 and U.S. Pat. No. 2,969,386).

"One gram equivalent NCO" is to be understood to be the quantity of a compound expressed in grams, which contains one isocyanate group. Similarly, "one gram equivalent OH" means the quantity of a compound expressed in grams which contains one hydroxyl group. "One gram equivalent NH" is to be understood to be the quantity of a compound expressed in grams which contains one isocyanate-reactive hydrogen atom bound to nitrogen. "Component B" preferably comprises saturated aliphatic from di- to hexa-hydric, preferably from di- to tetra-hydric polyols having OH-numbers from 50 to 1830, preferably from 100 to 1060, mg KOH/g substance or the above-mentioned polyols the aliphatic chains of which contain one or more groups, which may be the same or different, selected from the following phenylene, cyclohexylene, oxy (—O—), carboxylato (—C—O—), ureylene (—NH—C—NH—) and

oxycarbonylamino (—O—C—NH—),

or mixtures thereof.

Component (B) is free of organically bound sulphur.

As component (B), oxethylated, aliphatic, saturated di- and/or tri-ols having OH-numbers from 100 to 1060 mg KOH/per gram of substance are most particulary preferred.

Examples of component (B) are as follows:

(1) Saturated aliphatic from di- to hexa hydric alcohols, particularly from two to tetra hydric alcohols, such as ethylene glycol, propane diol-1,2, propane diol-1,3, neopentyl glycol, butane diol-1,4, hexane diol-1,6, decane diol-1, 10, glycerin trimethylolpropane, pentaerythritol, dipentaerythritol and the oxalkylation products of said two to hexa hydric alcohols with 1,2-alkylene oxides, such as ethylene oxide or propylene oxide; cycloaliphatic diols, such as cyclohexane diol-1,4, and 4,4'-dihydroxycyclohexyl-2,2-alkanes, such as 4,4'-dihydroxycyclohexyl-2,2-propane, and aralilphatic di-hydric alcohols, which optionally contain 1 or 2 ether oxygen atoms, such as bis- (oxethylated) bisphenol A and bis (oxpropylated) bisphenol A.

(2) Unsaturated or, preferably, saturated polyesters having at least two free hydroxyl groups obtained from the alcohols mentioned under (1) and at least one poly basic carboxylic acid or anhydride thereof, particularly dicarboxylic acids, such as maleic acid, fumaric acid, mesaconic acid, citraconic acid, itaconic acid, succinic acid, glutaric acid, adipic acid, sebacic acid, phthalic acid, isophthalic acid, terephthalic acid, trimellitic acid, hexahydrophthalic acid, tetrahydrophthalic acid, endomethylenetetrahydrophthalic acid, methylhexahydrophthalic acid.

(3) Mixtures of (1) and (2).

(4) Polyols containing ureylene groups and/or oxycarboxylamino (=urethane) groups, obtained from the polyols mentioned under (1) and (2) and from the polyisocyanates mentioned under (A) and mentioned in detail herein.

The following are examples of hydroxy alkyl acrylates (C): 2-hydroxyethyl-,2-hydroxypropyl-, 2-hydroxybutyl-, 3-hydroxypropyl-, 4-hydroxybutyl- and 6-hydroxyhexyl-acrylate. 2-hydroxy ethyl acrylate, 2-hydroxy propyl acrylate and 4-hydroxy butyl acrylate are preferred.

Component (D) may be one or more aliphatic or aromatic amino sulphonic acids. The following are examples: 2-aminoethanesulphonic acid, 2-methylaminoethanesulphonic acid, 2-butylaminoethane sulphonic acid and 2-(2-aminoethyl)-aminoethanesulphonic acid and similar, also aromatic, amino sulphonic acids, such as sulphanilic acid, diaminobenzene sulphonic acids, or the various amino naphthalene sulphonic acids. These compounds may be introduced into the reaction in the form of the free sulphonic acids or, preferably, as alkali metal salts or alkaline earth metal salt.

The reaction components are reacted together in the conventional manner either as such or in solvents which are inert in respect of isocyanates. Thereby, the polyisocyanate is initially preferably introduced and reacted with the hydroxyalkyl acrylate under mild conditions, e.g. at a temperature of from 20° to 100° C., preferably from 20° to 80° C. In accordance with this method, the other hydroxy components are added and, finally, the remaining isocyanate groups are reacted with component (D).

However, alternatives to this method are possible, particularly when a particular molecular structure or an influence on the molecular weight are required.

The reaction of the reaction components may advantageously be accelerated by adding catalysts.

Those known catalysts which may be used include, e.g. tertiary amines, such as triethylamine, tributylamine, N-methyl-morpholine, N-ethyl-morpholine, N,N,N'-tetramethyl-ethylene diamine, 1,4-diazabicyclo-(2,2,2)-octane, N-methyl-N'-dimethyl-aminoethyl-piperazine, N,N-dimethyl-benzylamine, bis-(N,N-diethylaminoethyl)-adipate, N,N-diethyl-benzylamine, pentamethyl-diethylene triamine, N,N-dimethylcyclohexylamine, N,N,N, N'-tetramethyl-1,3-butane diamine, N,N-dimethyl-β-phenyl-ethylamine, 1,2-dimethylimidazole, 2-methylimidazole. These catalysts may also include known Mannich bases obtained from secondary amines, such as dimethylamine, and aldehydes, preferably formaldehyde, or ketones, such as acetone, methylethyl ketone or cyclohexanone and phenols, such as phenol, nonylphenol or bisphenol.

Tertiary amine catalysts having isocyanate-reactive hydrogen atoms include the following, e.g. triethanolamine, triisopropanolamine, N-methyl-diethanolamine, N-ethyl-diethanolamine, N,N-dimethyl-ethanolamine, and the reaction products thereof with alkylene oxides, such as propylene oxide and/or ethylene oxide.

Silaamines having carbon-silicon bonds, as described, for example, in German Pat. No. 1,229,290 (corresponding to U.S. Pat. No. 3,620,984), may also be used as catalysts, e.g. 2,2,4-trimethyl-2-silamorpholine and 1,3-diethylaminoethyl-tetramethyl-disiloxane.

Nitrogen-containing bases are also suitable for use as catalysts, such as tetraalkyl ammonium hydroxides, also alkali metal hydroxides, such as sodium hydroxide, alkali metal phenolates, such as sodium phenolate, or alkali metal alcoholates, such as sodium methylate. Hexahydrotriazines may also be used as catalysts.

Organic metal compounds, particularly organotin compounds, may also be used as catalysts.

The following are particularly suitable as organotin compounds: tin (II) salts of carboxylic acids, such as tin (II) acetate, tin (II) octoate, tin (II) ethylhexoate and tin (II) laurate, and tin (IV) compounds, e.g. dibutyl tin oxide, dibutyl tin dichloride, dibutyl tin diacetate, dibutyl tin dilaurate, dibutyl tin maleate or dioctyl tin diacetate. Mixtures of the above-mentioned catalysts may, of course, be used.

Other examples of catalysts which may be used according to the present invention and details concerning the action of the catalysts are given in Kunststoff-Handbuch, Volume VII, published by Vieweg and Höchtlen, Carl-Hanser-Verlag, Munich, 1966, e.g. on pages 96 to 102.

These catalysts are usually used in quantities of from 0.001 to 10%, by weight, based on the quantity of reactants.

In order to protect the resulting products from undesired premature polymerisation, it is recommended to add from 0.001 to 0.1%, by weight, (based on the total mixture), of polymerisation inhibitors at the time of preparation.

Suitable auxiliary agents of this type are, for example, phenols and derivatives thereof, preferably sterically hindered phenols which contain alkyl substituents having from 1 to 6 carbon atoms in both o-positions to the phenolic hydroxy group, and amines, preferably secondary aryl amines and derivatives thereof, quinones, copper-I-salts of organic acids or addition compounds of copper-(I)-halides and phosphites.

The following may be mentioned as examples: 4,4'-bis-(2,6-di-t-butyl-phenol), 1,3,5-trimethyl-2,4,6-tris-(3,5-di-t-butyl-4-hydroxy-benzyl)-benzene, 4,4'-butylidene-bis-(6-t-butyl-m-cresol), 3,5-di-t-butyl-4-hydroxy-benxylphosphonic acid diethylester, N,N'-bis-($\beta$-naphthyl)-p-phenylene diamine, N,N'-bis-(1-methylheptyl)-p-phenylene diamine, phenyl-$\beta$-naphthylamine, 4,4'-bis-($\alpha,\alpha$-dimethylbenzyl)-diphenylamine, 1,3,5-tris-(3,5-di-t-butyl-4-hydroxy-hydrocinnamoyl)-hexahydro-s-triazine, hydroquinone, p-benzoquinone, 2,5-di-t-butylquinone, toluhydroquinone, p-t-butylpyrocatechol, 3-methyl-pyrocatechol, 4-ethyl-pyrocatechol, chloroanil, naphthoquinone, copper naphthenate, copper octoate, Cu (I) Cl/triphenylphosphite, Cu (I) Cl/trimethylphosphite, Cu (I) Cl/trischloroethylphosphite, Cu (I) Cl/trispropylphosphite, and p-nitrosodimethylaniline.

Other suitable stabilisers are described in "Methoden der organischen Chemie" (Houben-Weyl), 4th Edition, Volume XIV/I, P. 433–452, 756, Georg Thieme Verlag, Stuttgart, 1961.

The present reaction products are usually dispersed by simply being stirred in water. For this purpose, conventional stirring units may be used. In the case of the present products, it is usually unnecessary to use dispersing devices which produce a fine distribution of organic material in water as a result of an extreme shearing action.

The urethane acrylate binding agents may also be dispersed in water with the aid of relatively small quantities of solvents. After dispersion, the solvent may be removed by distillation or may, however, be left in the dispersion (emulsion). Solvents of this type are, for example, acetone, methyl ethyl ketone, ethyl acetate, butyl acetate, ethanol, isopropanol, and butanols. The solvents may be used in quantities of from 5 to 30%, by weight, based on the urethane acrylate binding agents and any reactive monomers.

Although in many cases the present binding agents may be dispersed in water and used such as they are after the reaction of the starting components, it is advisable in some cases, particularly when a special characteristic of the hardened plastic is required, also to use certain monomers as hardenable components during the hardening of the urethane acrylates. Basically, these may be:

(1) Esters of acrylic or methacrylic acids derived from aliphatic $C_1$–$C_8$, cycloaliphatic $C_5$ or $C_6$, araliphatic $C_7$ or $C_8$-mono hydric alcohols, e.g., methylacrylate, ethylacrylate, n-propylacrylate, n-butylacrylate, methylhexylacrylate, 2-ethylhexylacrylate, and the corresponding methacrylic acid esters; cyclopentylacrylate, cyclohexylacrylate, or the corresponding methacrylic acid esters; benzylacrylate, $\beta$-phenylethylacrylate, and corresponding methacrylic acid esters;

(2) Hydroxyalkylesters of acrylic or methacrylic acids having from 2 to 4 carbon atoms in the alcohol component, such as 2-hydroxyethylacrylate, 2-hydroxypropylacrylate, 3-hydroxypropylacrylate, 2-hydroxybutylacrylate, 4-hydroxybutylacrylate, or corresponding methacrylic acid esters;

(3) Di- and higher poly-acrylates and di- and higher polymethacrylates of glycols having from 2 to 6 carbon atoms and polyols having 3 or 4 hydroxyl groups and from 3 to 6 carbon atoms, such as ethylene glycol diacrylate, propane diol- 1,3-diacrylate, butane diol-1,4-diacrylate, hexane diol- 1,6-diacrylate, trimethylolpropane triacrylate, pentaerythrital tri- and tetra- acrylates and corresponding methacrylates also di (meth)-acrylates of polyetherglycols of glycol, propane diol- 1,3, butane diol-1,4 particularly triacrylates of oxethylated trimethylolpropane;

(4) Aromatic vinyl and divinyl compounds, such as styrene, methyl styrene, divinyl benzene;

(5) N-methylolacrylic amide or N-methylol methacrylic amide and corresponding N-methylolalkylethers having from 1 to 4 carbon atoms in the alkylether group or corresponding N-methylolallylethers, particularly N-methoxy-methyl(meth) acrylic amide, N-butoxymethyl (meth) acrylic amide and N-allyloxymethyl (meth) acrylic amide;

(6) Vinylalkylethers having from 1 to 4 carbon atoms in the alkyl group, such as vinylmethylether, vinylethylether, vinylpropylether, vinylbutylether;

(7) Trimethylolpropane diallylether mono (meth) acrylate, vinylpyridine, N-vinylcarbazole, triallylphosphate, and triallylisocyanurate.

Mixtures of the above-mentioned monomers may also be used. The additions may be from 5 to 30%, by weight, based on the mixture of the present urethane acrylate binding agents and additional monomers. It is particularly advantageous to use triacrylates of oxethylated trimethylol propane (1 mol of trimethylol propane and from 2.5 to 4 mols of ethylene oxide) as the additional hardenable component, because they are extremely reactive while also being watery, in spite of the increased molecular weights thereof.

The present reaction products or mixtures thereof with other monomers are usually hardened after evaporation of the water used for the dispersion and the solvent which may still be present by heating.

The dispersions produced from the present urethane acrylate binding agents may have solids contents of from 5 to 90% by weight. The term "solids content" is to be understood to refer to the total of urethane acrylate and any additional hardenable monomers.

Polymerisation may be effected using high-energy radiation, such as ultra violet light, electron or gamma radiation.

If the present reaction products are to be hardened by means of ultra-violet light, then it is necessary to add one or more photoinitiators. These are usually dissolved in the present resin and are dispersed with the resin in the aqueous phase.

The compounds which are usually used as suitable photoinitiators are, for example, benzophenone and also very generally aromatic keto compounds which are derived from benzophenone, such as alkyl benzophenones, halogen methylated benzophenones, according to German Offenlegungsschrift No. 1,949,010, Michlers ketone, anthrone, halogenated benzophenones. Benzoin and derivatives thereof are also suitable, according to German Offenlegungsschrift Nos. 1,769,168; 1,769,853; 1,769,854; 1,807,297; 1,807,301; 1,919,678; 2,430,081 and German Auslegeschrift No. 1,694,149. Anthraquinone and many of its derivatives are also effective photoinitiators, for example β-methyl anthraquinone, t-butyl anthraquinone and anthraquinone carboxylic acid ester, also oximeester, according to German Offenlegungsschrift No. 1,795,089.

Esters of phenyl glyoxyl acid may also be used advantageously, particularly polymerisable phenyl glyoxyl acid esters according to German Offenlegungsschrift No. 2,825,955.

The above-mentioned photoinitiators which are used with the present compounds are used in quantities of from 0.1 to 20%, by weight, preferably from 0.1 to 5%, by weight, based on the polymerisable components, and may be used singly or as mixtures because of the frequent advantageous synergetic effects.

Preferred additives, which may lead to a further increase in the reactivity, are certain tertiary amines, such as triethylamine and triethanolamine. They may be used in quantities of from 0 to 5%, by weight, based on the polymerisable components.

A preferred application of the present water-dispersible urethane acrylates is the use in strengthening fleeces, wherein they are polymerised either by means of ultra violet light or by electron beam, and hardened.

According to the prior art, non-woven fabrics (fleeces) are produced from fibre webs which have to be strengthened using binding agents. Thus, plastics in powder form or fibre form may be added to the web and melted by a thermal process. Thereby, the fibres of the web adhere together in the required manner.

Synthetic resins dispersed in water are more commonly used for the strengthening step. The reason for this is the easier handling, the more varied application possibilities and the plurality of effects connected thereto. Thus, the following desired characteristics may be achieved: graduations in the hand, draping-ability, bulking capacity, spring elasticity. The multiplicity of the available binding agents in dispersion form enables the adjustment of other characteristics, such as resistance to chemical cleaning, washing, heat-sealability, high tensile strength in the longitudinal and transverse directions, and abrasion-resistance.

Particularly impressive strengths, which are not lost as a result of the stresses during use and in care treatment (washing and chemical cleaning) are obtained by using cross-linkable binding agents. Up until now the process of cross-linking is, in all cases, carried out thermally by initiating a chemical reaction by heating to a temperature of above 100° C., which reaction increases the molecular weight of the resin by crosslinking. The most important types of reaction are:

(1) Vulcanisation of polymers containing double bonds, for example, with sulphur;

(2) Cross-linking using added resins, for example, aminoplasts;

(3) Sefl-cross-linking via incorporated reactive monomers, such as N-methylolacrylamide.

In contrast to these conventional cross-linking processes, the use of the present dispersible urethane acrylates provides numerous advantages:

Apart from the fact that, for hardening these binding agents, only extremely short exposure times, of the order of seconds and less, are required, a considerable amount of energy is saved compared to a thermal crosslinking of conventional binding agents. In addition to this, using the web binding processes according to the present invention, very good strengths, particularly of the wet webs, are obtained.

Another use of the water-dispersible urethane acrylates, hardenable by high energy radiation or ultra-violet light is the use thereof in the production of coatings. They are particularly suitable for coating wood, paper, plastic, metal, glass, concrete, cement, gypsum or ceramic material. It is a prerequisite in this case that the applied dispersion initially forms a film before the hardening process is effected using radiation. This film-forming process usually takes place while the water escapes from the film (thicknesses from 10 to 200 μm) in a short time without necessitating the supply of heat.

Artificial radiators, the emission of which is in the range of from 2500 to 5000 Å, preferably from 3000 to 4000 Å, may be used as a source of radiation for carrying out the photo-polymerisation process. Mercury vapour, xenon and tungsten lamps, particularly high pressure mercury radiators, are advantageous.

Layers of the present reaction products usually harden into a film in less than one second, when exposed to the light of a high pressure mercury lamp, for example, of the type HTQ-7 made by Philips, positioned at a distance of approximately 8 cm.

If fillers are also used with the present resinous compositions, then only those may be used which do not suppress the polymerisation process by the absorption behaviour thereof. Talcum, barite, chalk, calcium sulphate, silica, asbestos powder and gypsum may be used, for example, as light-permeable fillers.

If hardening takes place using thermal initiators or by high-energy radiation, e.g. electron beam or γ-radiation, then in general, all conventional fillers, pigments and strengthening materials are applicable.

In the following Examples, the present binding agents and the use thereof are illustrated. The stated parts and percentages are by weight, unless otherwise indicated. The stated equivalents are gram-equivalents.

EXAMPLE 1

387.6 g (=1.2 equivalents NCO) of a 75% solution of a polyisocyanate of 79.6% of toluene diisocyanate, 6.1% of butane diol-1,3 and 14.3% of trimethylolpropane and ethyl acetate (NCO-content of the solution 13%) are introduced into a 2 l three-necked flask fitted with a stirrer, a dropping funnel and a gas inlet and were reacted drop-wise with 69.4 g (=0.6 equivalents OH) of hydroxy ethyl acrylate in the presence of 0.18 g of p-methoxy phenol under introducing air at 60° C. After 2 hours, 566.6 g (=0.4 equivalents OH) of a linear polyester containing hydroxyl groups, from adipic acid and diethylene glycol (OH-content 1.2%, molecular weight M=2000), dissolved in 160 g of acetone, were simultaneously added drop-wise and this was then stirred for 8 hours at 60° C. 40.4 g (=0.2 equivalents NH) of a 47% solution of 2-(2-aminoethyl)-aminoethane sulphonic acid-Na-salt in acetone were then added drop-wise. After further stirring for 90 minutes at 60° C., no more free isocyanate could be detected. The formed resin was stirred with a further 69 g of acetone. 21 g (2%, based on polymerisable substance) of β-cyano ethyl benzoin ethyl ether as the photoinitiator were added thereto.

The resulting resin could be converted into a stable finely-divided emulsion by adding water with stirring 37.5 parts of the acetonic solution were mixed with 17 parts of water with rapid stirring at room temperature. The emulsion was applied to a glass plate in a layer 200 μm thick and was allowed to dry. After a few minutes, a clear, smooth film had formed which was hardened by being passed at a rate of 20 m/min. under a high pressure mercury lamp (80 W/cm radiator length) from the firm Hannovia. The resulting lacquer film was solvent-resistant, scratch-resistant and hard.

EXAMPLE 2

As in Example 1, 193.9 g (=0.6 equivalents NCO) of a 75% solution of a polyisocyanate of 79.6% of toluylene diisocyanate, 6.1% of butane diol-1,3 and 14.3% of trimethylolpropane in ethyl acetate (NCO-content of the solution 13%) were reacted with 46.4 g (=0.4 equivalents OH) of hydroxy-ethyl acrylate in the presence of 0.1 g of p-methoxy-phenol. 34.85 g (=0.4 equivalents NCO) of toluylene diisocyanate were added thereto and this was then reacted with 566.7 g (=0.4 equivalent OH) of a linear polyester containing hydroxyl groups of adipic acid and ethylene glycol (OH content 1.2%, molecular weight M=2000), dissolved in 278 g of acetone. After 4 hours at 60° C., 40.4 g (=0.2 equivalents NH) of a 47% solution of 2-(2-aminoethyl)-aminoethane sulphonic acid-Na-salt in acetone were added drop-wise.

After a further 90 minutes, the acetone was distilled off, finally under vacuum, and the reaction product was diluted with 203 g of trioxyethyl trimethylolpropane triacrylic acid ester. 41 g of benzil dimethyl ketal were also added thereto.

This product could also be converted into a stable emulsion by the addition of water with stirring.

EXAMPLE 3

As in Example 1, 193.8 g (0.6 equivalents NCO) of a 75% solution of a polyisocyanate of 79.6%, by weight, of toluylene diisocyanate, 6.1% of butane diol-1,3 and 14.3% of trimethylolpropane in ethyl acetate (NCO-content of the solution 13%) were reacted with 46.4 g (=0.4 equivalents OH) of hydroxyethyl acrylate in the presence of 0.1 g of p-methoxyphenol. 34.85 g (=0.4 equivalents NCO) of toluylene diisocyanate were added thereto and this was then reacted with 80 g (0.4 equivalents OH) of a polyester of phthalic acid anhydride and ethylene glycol (OH-content approximately 8.5%). After 4 hours at 60° C., 40.4 g (=0.2 equivalents NH) of a 47% solution of 2-(2-aminoethyl)-aminoethane sulphonic acid-Na-salt in acetone were added drop-wise.

After a further 90 minutes, 14.5 g of benzil dimethyl ketal were added thereto and the mixture was cooled.

After mixing with water, this product also produced an emulsion which was stable for months which was particularly suitable for coating wood and cardboard boxes.

EXAMPLE 4

As in Example 1, 152.7 g (=0.6 equivalents NCO) of the polyisocyanato biuret of hexamethylene diisocyanate (NCO-content 16.5%) were reacted with 46.4 g (=0.4 equivalents OH) of hydroxy-ethyl acrylate in the presence of 0.19 g of p-methoxy-phenol. 33.6 g (=0.4 equivalents NCO) of hexamethylene diisocyanate were added thereto and this was then reacted with 400 g (=0.4 equivalents OH) of a linear polypropylene glycol having M-2000 (OH-content 1.7%), dissolved in 500 g of acetone. After 8 hours at 60° C., 40.4 g (=0.2 equivalents NH) of a 47% solution of 2-(2-aminoethyl)amino ethane sulphonic acid-Na-salt in acetone were dropped in. After a further 90 minutes, 17.4 g of benzil dimethyl ketal (photoinitiator) were added thereto.

The thus-obtained product could be converted into an emulsion, which was stable for several months, by adding water with stirring.

EXAMPLE 5

As in Example 1, 193.8 g (=0.6 equivalents NCO) of a 75% solution of a polyisocyanate of 79.6% of toluylene diisocyanate 6.1% of butane diol-1,3 and 14.3% of trimethylolpropane in ethyl acetate (NCO-content of the solution 13%) were reacted with 34.8 g (=0.3 equivalents OH) of hydroxy-ethyl acrylate in the presence of 0.1 g of p-methoxy-phenol. After 3 hours at the same temperature, 284 g (=0.2 equivalents OH) of a linear polyester containing hydroxyl groups of adipic acid and diethylene glycol (OH-content 1.2%, molecular weight M=2000), were added thereto. After a reaction time of 24 hours, an NCO-content of 1.2% could still be detected and 19.5 g (0.1 mol=0.1 equivalents NH) of p-sulphanilic acid-Na-salt, suspended in 114 g of acetone, were added to the mixture. After a further 12 hours, the mixture was gradually diluted with 1100 ml of water and was allowed to cool to room temperature. The resulting emulsion was stable and could be hardened, after drying to a clear film, using electron radiation, to an insoluble, resilient coating.

EXAMPLE 6

840 g (10 equivalents NCO) of hexamethylene diisocyanate were introduced into a 3 l three-necked flask fitted with a stirrer, a funnel and a gas inlet and were reacted with 232 g (2 equivalents OH) of hydroxy-ethyl acrylate in the presence of 0.36 g of p-methoxy-phenol, and under introducing air at 60° C. After 12 hours at this temperature, 152 g (4 equivalents OH) of propylene glycol-1,3 and 134 g (3 equivalents OH) of trimethylolpropane, dissolved in 781 g of acetone, were added thereto and this was allowed to react for a further 24 hours. 537 g of a 30% solution in water (1 equivalent NH) of 2-methylamino ethane sulphonic acid-Na-Salt were then added drop-wise in. After one more hour, the acetone was distilled off under reduced pressure and the mixture was emulsified with 117 ml of water.

This emulsion was also stable for several months and after 5%, based on the polymerisable resin, of benzil dimethyl ketal (photoinitiator), had been mixed in, the emulsion could be used for strengthening a web.

EXAMPLE 7

Strengthening a carded fleece

A fibrous fleece composed of viscose fibres 1.7 dtex/40 mm having a flat weight of 17 g/m$^2$ was produced on a carding engine. The strengthening process was carried out using a 5% emulsion of the urethane resin according to Example 2. The binding agent was applied in a screen belt foulard. After driving off the water, the exposure step was carried out using a high pressure Hg radiator (manufacturer Hanovia) at an output of 80 watt/cm radiator length at a fleece feed rate of 10 m/min.

The application of the binding agent was measured at 20%. The strength in the longitudinal direction was 2.8 MPa/cm$^2$, in the transverse direction 1.6 MPa/cm$^2$. The fleece was soft to the touch and was resistant even when stored in water for several weeks. Purpose of use: a nappy covering.

EXAMPLE 8

Strengthening a wet fleece

A fibre fleece, consisting of 55% rayon 1.7 dtex/8 mm and 45% of cellulose sulphate, which had been applied onto a paper machine in an amount of 35 g/m$^2$, was sprayed with a 20% emulsion of the resin according to Example 2, after the excess water had been sucked off. After driving off the water, a binding agent application of 25% was measured. The emulsion of the urethane acrylate had been prepared by intensively stirring a mixture of 20 parts of resin and 80 parts of water at room temperature using a propeller mixer at 200 rpm.

The fleece was exposed using an ultra-violet radiator, the intensity of which was 80 watt/cm and the belt velocity was 10 m/min. The fleece had a strength of 7.6 MPa/cm$^2$ in the dry condition and a strength of 1.1 MPa/cm$^2$ in the moist condition. Purpose of use: e.g. hospital bed linen.

EXAMPLE 9

A 50% emulsion was prepared from the unsaturated urethane acrylate, prepared according to Example 3, to which 3%, by weight, of α-cyano ethyl benzoin ethyl ether was added, by adding water with stirring. This emulsion was applied to a wooden board in a layer 60μ thick.

After 3 minutes at room temperature, a clear film had formed which was hardened at a distance of 8 cm from a high pressure mercury lamp (manufacturer Hanovia) at 80 W/cm radiator length using a feed rate of 15 m/min. The resulting lacquer film was resistant to water and solvents and was capable of being effectively smoothed.

We claim:

1. A water-dispersible radiation crosslinkable urethane acrylate binding agent which comprises a reaction product of:
   (A) 1 gram equivalent (based on-NCO of a di- or tri-isocyanate;
   (B) from 0 to 0.7 gram equivalent OH of a polyol, free of organically bound sulphur;
   (C) from 0.1 to 0.7 gram equivalent OH of a hydroxy-($C_2$-$C_6$ alkyl)acrylate; and
   (D) from 0.01 to 0.5 gram equivalent NH of an amino sulphonic acid or an alkali metal or an alkaline earth metal salt thereof having from 1 to 4 Amino groups per sulphonic acid group;
   the ratio of NCO group: NCO-reactive groups being from 1:1 to 1:1.2.

2. A process for the preparation of a binding agent, as claimed in claim 1 which comprises reacting components (A), (B), (C) and (D) in a ratio of NCO groups: NCO-reactive groups of from 1:1 to 1:1.2 at a temperature of from 20° to 100° C.

3. A process for the production of a coating which comprises applying to a substrate a layer of an aqueous dispersion of a binding agent, as claimed in claim 1, drying the applied layer and hardening the resulting film by the action of radiation.

4. A process for the impregnation and strengthening of a woven or non-woven material which comprises impregnating the material with an aqueous dispersion of a binding agent, as claimed in claim 1, removing the volatile ingredients from the dispersion and hardening the resulting binder by the action of radiation.

5. A process for the production of painting and printing colours which comprises using an aqueous dispersion of a binding agent, as claimed in claim 1.

* * * * *